Dec. 29, 1964 R. B. DOME 3,163,714

AUTOMATIC BRIGHTNESS CONTROL

Filed March 30, 1961

INVENTOR:
ROBERT B. DOME,
BY Joseph Levinson
HIS ATTORNEY.

3,163,714
Patented Dec. 29, 1964

3,163,714

AUTOMATIC BRIGHTNESS CONTROL

Robert B. Dome, Geddes Township, Onondaga County, N.Y., assignor to General Electric Company, a corporation of New York Filed Mar. 30, 1961, Ser. No. 99,441
8 Claims. (Cl. 178—7.5)

Figures 1, 2:
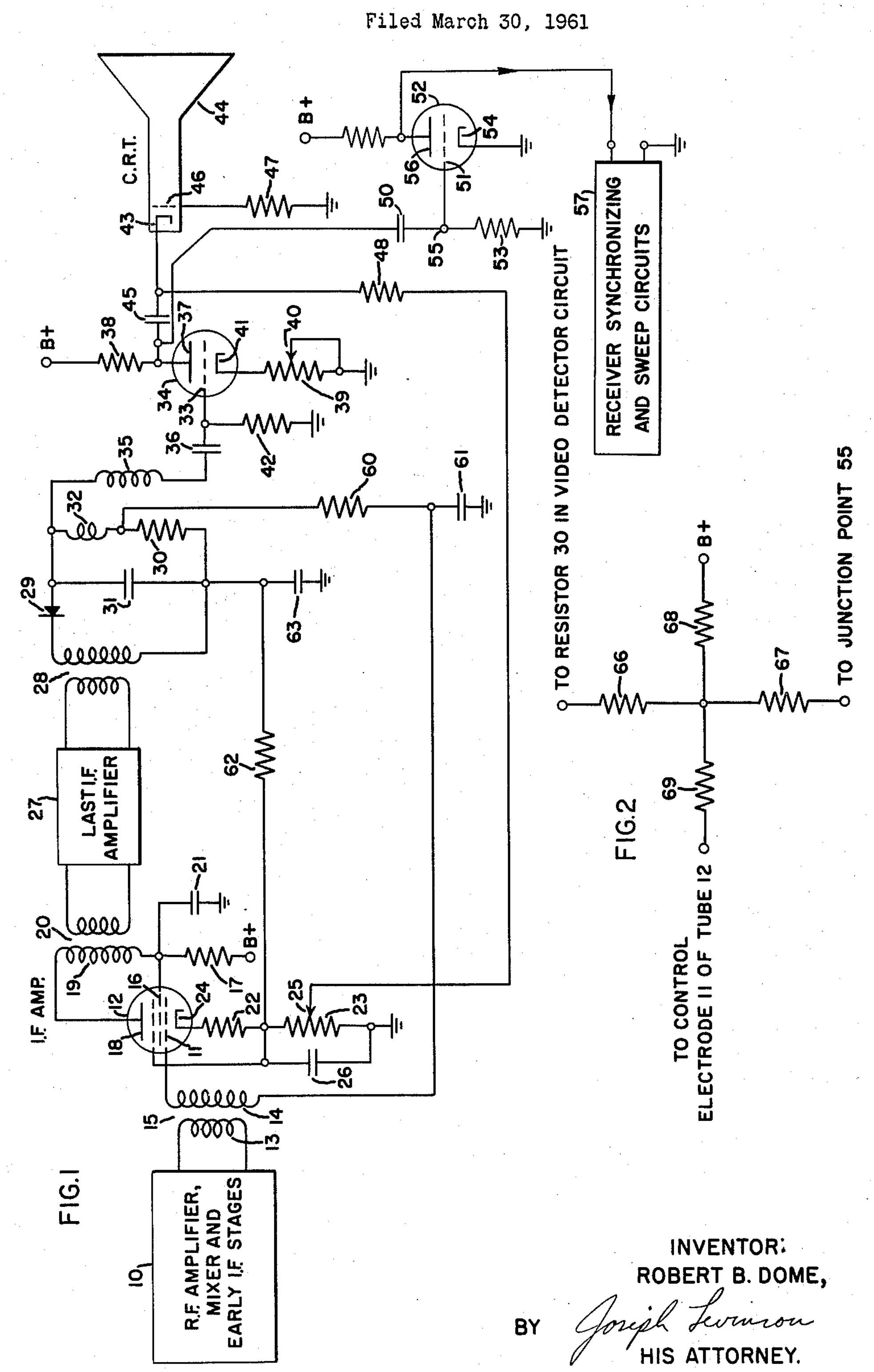

This invention relates to a circuit arrangement for providing automatic brightness control in a television receiver and more particularly to a means for providing automatic variations in the brightness of a reproduced image in accordance with the intensity of a received television signal.

Many present day television receivers utilize A.C. coupling between the video detector circuit and the control electrodes of the picture tube without providing means for restoring the D.C. component of video voltage lost by virtue of the A.C. coupling. Such an arrangement is advantageous because the effect of noise spikes superimposed on the video signal and errors in set-up at the television transmitter are less pronounced in the reproduced image than when the D.C. component is reinserted in the video signal. The resulting picture is therefore more pleasing to the eye.

A disadvantage arising from an A.C. coupling of the video signal to the picture tube without D.C. restoration is the fact that when the bias on the picture tube has been established by the viewer by adjustment of the manual brightness control to create a desired brightness level for the scene then being viewed, the brightness level of the reproduced scene will generally be unpleasant to the eye when the amplitude of the video signal changes significantly. When the brightness level is adjusted for viewing a video signal of relatively high level, the picture tube control electrodes will normally be biased at a relatively low voltage thus allowing the video signal to alternate fully within the control electrode brightness characteristic of the picture tube. More specifically, the black portions of the video signal should correspond approximately with the point on the brightness characteristic where the light output is just zero. When now the amplitude of the video signal is reduced significantly so as to be of relatively low level and the bias voltage on the control electrodes remains at the value preselected for the prior high level video signal, the video signal of low level will alternate about the same low bias voltage. As a result, the black portion of this low level video signal is unable to swing to full black on the control electrode brightness characteristic thereby giving the reproduced scene a "washed out" appearance. Similarly, when a video signal of relatively low level is applied to the control electrodes of the picture tube and the control electrode bias is initially adjusted to allow the black portion of this relatively low contrast signal to swing to full black, portions of the black level of a relatively high level signal subsequently received will be lost because of the initial relatively large bias voltage. Significant changes in the amplitude of the video signal can occur when there are changes in the amplitude of a received carrier wave when, for example, a different channel is selected so as to tune the receiver to a more or less distant station than initially selected. In order to maintain a desirable viewing brightness, the viewer must then readjust the brightness level. This requirement for readjustment of the brightness level by the viewer is, of course, undesirable.

It is therefore an object of this invention to provide an automatic brightness control for a television receiver which is responsive to changes in the intensity of a received carrier wave.

It is a further object of this invention to provide an automatic brightness control in which changes in picture tube brightness are made in proportion to change in an AGC signal.

It is a further object of this invention to provide an automatic brightness control in which the advantages of A.C. coupling the video signal to the picture tube are retained.

It is also an object of this invention to provide an automatic brightness control that adds negligible cost to the receiver.

In accordance with the present invention, in a television receiver a control voltage proportional to the amplitude of a received radio frequency wave is provided and is utilized to vary a preset bias voltage on the control electrode of a cathode ray picture tube in a manner so as to increase the brightness level on the picture tube with increasing radio frequency signal amplitude and decreases the brightness level with decreasing radio frequency signal amplitude. In a preferred embodiment of the invention, the control signal is amplified prior to coupling the control signal to the bias circuit of the cathode ray picture tube.

Further objects, features and the attending advantages of the invention will be apparent with reference to the following specification and drawings, in which:

FIGURE 1 is a circuit diagram showing portions of a television receiver embodying the present invention, and FIGURE 2 illustrates a combining resistor network that can be used in circuits in which a control signal is obtained from a second detector and clipper-separator grid circuit.

Referring now to FIGURE 1, the block 10 represents the RF amplifier, mixer and early IF stages in a television receiver. The output signal from block 10 is coupled to an input control electrode 11 of IF amplifier tube 12 via the primary winding 13 and secondary winding 14 of transformer 15. Operating potential for tube 12 is supplied to screen electrode 16 via resistor 17 and to an output anode electrode 18 via resistor 17 and the primary winding 19 of transformer 20. Capacitor 21 is a decoupling capacitor. A bias resistor 22 is connected in series between a potentiometer 23 and the cathode electrode 24 of tube 12. The cathode electrode 24 in conjunction with input control electrode 11 comprises an input electrode for input voltages and in conjunction with output anode electrode 18 comprises an output electrode for output voltages. One end of potentiometer 23 is connected to a ground potential bus which is generally but not necessarily the chassis of the receiver. Potentiometer 23 has a sliding arm 25 and the entire resistance of potentiometer 23 is shunted by a by-pass capacitor 26. An alternating output voltage of tube 12 is coupled by transformer 20 to the last stage of IF amplification 27. In turn, the output signal from the last stage of IF amplification 27 is coupled via transformer 28 to the video detector circuit.

The video detector circuit comprises a rectifier 29 and a load impedance including a load resistor 30, an IF bypass capacitor 31 and a compensating inductance 32 connected in series with the load resistor 30. The detected video signal is coupled to the grid 33 of the video amplifier tube 34 through the series connected compensating inductance 35 and coupling capacitor 36. Operating potential is applied to the anode 37 of tube 34 via load resistor 38. A contrast control potentiometer 39 having a sliding arm 40 connects the cathode 41 of tube 34 to ground potential. The arm 40 is connected to ground potential. A grid resistor 42 connects control electrode 33 to ground potential. The video signal amplified by tube 34 is coupled from anode 37 to the cathode 43 of cathode ray picture tube 44 by a coupling capacitor 45. The control electrode 46 of picture tube 44 is connected to ground potential by a resistor 47. The cathode and control electrodes 43 and 46 comprise video signal input electrodes for the picture tube 44. A bias resistor 48 is connected between the cathode 43 of picture tube 44 and the movable arm 25 of potentiometer 23.

The amplified video signal is coupled by a capacitor 50 from the anode 37 to a control electrode 51 of an amplifying device 52 in a conventional synchronizing signal separator circuit. A grid resistor 53 is provided and coupled between a cathode electrode 54 and a junction 55 of capacitor 50 and control electrode 51. Separated synchronizing signal components are coupled from an anode electrode 56 of the device 52 to conventional synchronizing and sweep circuits for the receiver, indicated generally by the block 57.

The D.C. component of video voltage developed across video detector load resistor 30 is coupled to the control electrode 11 of tube 12 by a filtering circuit comprising resistor 60 and capacitor 61 via the secondary winding 14 of transformer 15. One end of load resistor 30 is connected to the junction of bias resistor 22 and potentiometer 23 in the cathode circuit of tube 12 by a filtering resistor 62. A capacitor 63, connected between the same end of load resistor 30 and ground potential, by-passes video frequency voltages to ground.

Considering briefly the operation of the circuit of FIGURE 1 as a whole and neglecting for the moment the operation of the automatic brightness control, a received radio frequency signal having video modulation components is amplified, converted to an intermediate frequency which is utilized in the receiver, and further amplified in block 10. This amplified IF signal having video modulation components is coupled from block 10 to an input electrode 11 of IF amplifying tube 12 where it is further amplified and coupled to the last IF amplifier stage 27 via transformer 20. Transformer 28 couples the IF signal to the video detector circuit. Here the video modulation components are separated from the IF signal and coupled by capacitor 36 to the video amplifier tube 34 for further amplification. Because of this capacitive A.C. coupling by capacitor 36, the D.C. component of the detected video signal is not transfered to control grid 33 of tube 34. Capacitor 45 couples the amplified video signal from the anode 37 of tube 34 to the cathode 43 of picture tube 44 wherein an electron beam is modulated in accordance with the video information contained in the video signal. The amplitude of the video signal may be controlled by the manual contrast control 39 in the cathode circuit of tube 34.

The operation of the automatic brightness control will now be considered. A detected video signal voltage appears across load resistor 30 in the video detector circuit and includes a D.C. component of voltage. The amplitude of this D.C. component of voltage is proportional on the average to the amplitude of a received radio frequency signal. That is, the amplitude of the D.C. component of the video signal is not proportional to the instantaneous peak-to-peak amplitude of the received radio frequency signal alone but is also proportional to the background brightness level contained in the video signal. However, over a period of time the D.C. component is proportional to the amplitude of the received radio frequency signal. The D.C. component of the video signal can therefore be utilized as a control signal indicative of the amplitude of the received radio frequency signal. This feature is well known in the art. The amplitude of the D.C. component of the detected video signal is almost always insufficient to provide an adequate control voltage. It is known in the art, therefore, to amplify the D.C. component voltage before utilization. In Patent Number 2,863,997, entitled "Automatic Gain Control Amplifier," which was issued to me on December 9, 1958, and which is assigned to the assignee of the present invention I describe a system for amplifying the D.C. component voltage of the detected video signal and for utilizing the amplified D.C. component as an automatic gain control signal.

In the present invention the D.C. component of video voltage is coupled from resistor 30 by resistor 60 to the control grid 11 of IF amplifier tube 12 through the secondary winding 14 of transformer 15. This D.C. component of video voltage is then amplified in the following manner. The rectifier 29 is connected to the video detector load impedance so as to conduct current only on the negative portions of the IF signal. The D.C. component of video voltage is therefore a negative voltage which has a greater negative amplitude with increasing radio frequency signal amplitude and lesser negative amplitude with decreasing radio frequency signal amplitude. A bias voltage is established in the control electrode 11 to cathode 24 circuit of amplifying tube 12 by a self biasing resistor 22 and by the D.C. component of video signal. This D.C. component is connected between the control electrode 11 and cathode 24 by the filter circuits comprising resistor 60 and capacitor 61 and resistor 62 and capacitor 63 respectively. Because a connection is made by the filter comprising resistor 62 and capacitor 63 to the junction of resistor 22 and potentiometer 23, tube 12 operates as a voltage amplifier for the cathode load comprising potentiometer 23 and not as a cathode follower circuit which would be the case if load resistor 30 in the video detector circuit were connected to ground potential rather than to resistor 62 and capacitor 63. Since this negative D.C. voltage is applied to the control electrode of tube 12, it will vary the voltage between the control electrode 11 and cathode 24 and the D.C. component of plate current in tube 12 will therefore vary responsive to variations in the amplitude of the received radio frequency signal. Since potentiometer 23 is connected in series with the cathode 24 of tube 12, the D.C. component of plate current of tube 12 will flow through potentiometer 23. The D.C. component of the detected video signal will thus appear in amplified form across this potentiometer 23. Resistor 60 and capacitor 61 operate as a low pass filter and prevent any video frequencies from appearing at the control electrode 11 of tube 12. Resistor 62 couples one end of load resistor 30 to the junction of resistor 22 and potentiometer 23 in the cathode circuit of tube 12. Capacitor 63 by-passes any IF and video frequencies to ground. Capacitor 26 by-passes IF frequencies, which are also amplified by tube 24, around the potentiometer 23.

Referring now to the bias circuit of picture tube 44, the brightness level for picture tube 44 is established by the control electrode to cathode bias circuit comprising resistor 47, resistor 48 and the potentiometer 23 which is connected in the cathode circuit of tube 12. The arrangement of FIGURE 1 illustrates the control electrode 46 of picture tube 44 maintained at ground potential by resistor 47 and a resistor 48 connected in series with the cathode 43 which conducts cathode current and provides a cathode 43 to control electrode 46 bias voltage. D.C. current flowing in cathode 43 and resistor 48 also passes through the sliding arm 25 of potentiometer 23 and that portion of the resistance of potentiometer 23 between the sliding arm 25 and the end of potentiometer 23 connected to ground potential or the common bus circuit. The voltage drop across this resistance included between arm 25 and ground potential adds to the voltage drop across the resistance 48 to establish the bias voltage on picture tube 44. Since D.C. operating current for tube 12 also passes through this lower portion of potentiometer 23, the voltage at arm 25 and thus at the cathode 43 of tube 44 will be proportional to the D.C. plate current of tube 12. But, since the D.C. plate current of tube 12 is inversely proportional to the amplitude of the received radio frequency signal, the bias on tube 44 will be inversely proportional to the amplitude of the received radio frequency signal.

The potentiometer 23 is illustrated as operating as a manual brightness control. Movement of the sliding arm 25 to a desired position on potentiometer 23 will establish an initial bias on tube 44. Variations in the amplitude of the received carrier wave will result in changes in D.C. operating current in tube 12 and therefore in the potential at arm 25 resulting in changes in the initial bias voltage on tube 44. When utilizing the potentiometer 23 as a manual brightness control, the arm 25 may be moved between the end connected to ground potential providing minimum bias and the other end connected to resistor 22 providing a maximum bias. Resistor 48 is selected so that when minimum bias is selected, the maximum desired brightness for the picture tube is provided by the voltage drop across resistor 48 alone. Alternatively, the resistance 23 need not be a potentiometer but may consist of two resistors selected to replace the value of resistances between the arm 25 and the ends of the potentiometer 23. Furthermore, as another alternative, a single resistor may be subsitituted for the potentiometer 23 in which case resistor 48 would be connected to the junction of resistor 22 and the single resistor replacing potentiometer 23.

FIGURE 2 is presented to illustrate that the present invention may be utilized with the better designed television sets in which a control voltage is obtained from the combination of a detector and clipper-separator grid circuit rather than from the detector circuit alone. This combination is used because, as has already been stated, although the D.C. component of video signal available at the detector load circuit is indicative of the received radio frequency signal amplitude, it is also subject to variations resulting not only from changes in the amplitude of the received radio frequency signal but also from changes in the background brightness level. For example, the amplitude of the received radio frequency signal may remain constant while the background scene brightness might change. This would normally result in a change of D.C. component of video signal voltage responsive to the change in background brightness. This, of course, is undesirable. It can be shown that the average value of the D.C. component of the clipper-separator grid circuit voltage changes in response to changes in the background brightness in just the opposite manner from changes in the D.C. component of video signal in the detector circuit. For example, in the clipper-separator grid circuit, for black portions of the background brightness the negative voltage is not very large but is large for white portions. When the outputs of the detector and clipper-separator grid circuit are properly combined they will exactly compensate one another to produce a substantially constant level D.C. output voltage when the radio frequency signal amplitude remains constant regardless of the information which modulates the radio frequency signal.

The resistance network shown in FIGURE 2 can be used to combine the outputs of the detector and the clipper-separator grid circuits in order to provide a control signal voltage. Resistors 66 and 67 are connected respectively, to the junction of resistor 30 and inductor 32 in the detector circuit and to the junction 55 in the clipper-separator grid circuit. When the values of resistors 66 and 67 are properly chosen, the voltage at the junction of these resistors is of constant amplitude so long as there is a constant amplitude radio frequency signal input to the television receiver. However, the voltage at the junction of these resistors will vary with changes in the amplitude of the received radio frequency signal so that it is suitable for a control voltage indicative of receiver radio frequency signal amplitude alone. Resistor 69 in FIGURE 2 is a filter resistor corresponding to the filter resistor 60 of FIGURE 1 and is coupled to the control electrode 11 of tube 12. A small amount of B+ current is conducted to the junction between resistors 66 and 67 through resistor 68. This current overcomes the negative D.C. component that is present from the detection of noise alone in the detector circuit.

From the preceding description, it can thus be seen that a circuit has been provided for automatically varying the brightness level on a picture tube in response to variations in the amplitude of received radio frequency signal. This automatic bias control is achieved by utilizing a control signal proportional to the amplitude of a received radio frequency signal, amplifying this control signal, and coupling this control signal to the bias circuit of the picture tube to provide increased brightness levels with increased carrier amplitudes and decreased brightness levels with decreased carrier amplitudes thus insuring that the video signal will encompass the range from full black to its peak white level.

Although the present invention has been described as utilizing automatic gain control signals developed in systems illustrated in FIGURES 1 and 2, it is equally applicable for use with other types of automatic gain control systems. The present invention is also equally applicable in any electrical apparatus in which a cathode ray tube is utilized for displaying information which modulates a received radio frequency signal.

Wheil I have illustrated and described and have pointed out in the annexed claims certain novel features of my invention, it will be understood that various omissions, substitutions and changes in the forms and details of the system illustrated may be made by those skilled in the art without departing from the spirit of the invention and the scope of the claims.

What I claim as new and desire to secure by Letters Patent of the United States is:

1. In a television receiver, automatic brightness control means comprising: a cathode-ray tube for displaying a video signal modulation component of a received radio frequency signal; said cathode-ray tube including first and second video signal input electrodes; circuit means for establishing a direct-current bias voltage between said input electrodes; said bias establishing circuit means including an intermediate frequency amplifier arranged for providing direct-current voltage amplification of a direct-current input voltage; said amplifier including a resistive load impedance and means direct-current intercoupling said load impedance and one of said cathode-ray tube input electrodes; circuit means providing a direct-current voltage having an amplitude which on the average is proportional to the maximum amplitude of a received radio frequency signal; and means direct-current coupling said latter direct-current voltage to said intermediate frequency amplifier in a manner for causing said latter direct-current voltage to be generated in amplified form across said load impedance whereby the background brightness of a reproduced image is increased and decreased when a respective increase and decrease occurs in the amplitude of a received radio frequency signal.

2. In a television receiver, automatic brightness control means comprising: a cathode-ray tube for displaying a video signal modulation component of a received radio frequency signal; said cathode-ray tube having first and second video signal input electrodes; an intermediate frequency amplifier including an amplifying device having signal input and output electrodes, a resistive load impedance coupled between said output electrodes and arranged for conducting a direct-current operating current of the device and means for by-passing said resistive impedance for alternating currents; a video detector circuit means providing a direct-current voltage component of the video signal; means direct-current coupling said direct-current voltage component from said video detector circuit means to said amplifying device input electrodes in a manner for providing voltage amplification of said direct-current component across said resistive load impedance; means establishing a direct-current potential at said first input electrode of said cathode-ray tube; and means direct-current intercoupling said resistive load impedance and said second input electrode of said cathode-ray tube whereby the background brightness of a reproduced image is increased and decreased when a respective increase and decrease occurs in the amplitude of a received radio frequency signal.

3. In a television receiver, automatic brightness control means comprising: a cathode-ray tube for displaying a video signal modulation component of a received radio frequency signal; said cathode-ray tube having first and second video signal input electrodes; video detector circuit means providing a direct-current voltage component of the video signal; a source of alternating voltage to be amplified; an intermediate frequency voltage amplifier including an amplifying device having input and output electrodes, and first and second load impedances serially coupled between said output electrodes, said first load impedance comprising a resistive impedance and means by-passing alternating currents about said resistive impedance; means coupling said alternating voltage to said input electrodes; means coupling an amplified alternating voltage from said second load impedance to a utility circuit; means direct-current coupling said direct-current voltage component from said video detector circuit means to said amplifying device input electrodes in a manner for providing voltage amplification of said direct-current component across said resistive load impedance; means establishing a direct-current potential at said first input electrode of said cathode-ray tube; and means direct-current intercoupling said resistive load impedance and said second input electrode of said cathode-ray tube whereby the background brightness of a reproduced image is increased and decreased when a respective increase and decrease occurs in the amplitude of a received radio frequency signal.

4. In a television receiver, automatic brightness control means comprising: a cathode-ray tube for displaying a video signal modulation component of a received radio frequency signal; said cathode-ray tube having first and second video signal input electrodes; a video signal detector circuit having a load impedance for developing a direct-current voltage component of the video signal; a ground bus; an intermediate frequency amplifying stage including an electron discharge amplifying device having cathode, and control electrodes; a first resistive load impedance coupled between said cathode electrode and said ground bus and means by-passing alternating current components around said resistive load impedance; means direct-current coupling said direct-current voltage component between said control and cathode electrodes; a second resistive impedance direct-current intercoupling said first resistive load impedance and said first input electrode of said cathode-ray tube; and means establishing a direct-current potential at said second input electrode of said cathode-ray tube.

5. The apparatus of claim 4 wherein said resistive load impedance comprises a potentiometer having a tap, and said second resistive impedance interconnects said tap and said first input electrode of said cathode-ray tube.

6. In a television receiver, automatic brightness control means comprising: a cathode-ray tube for displaying a video signal modulation component of a received radio frequency signal; said cathode-ray tube including first and second video signal input electrodes; circuit means for establishing a direct-current bias voltage between said input electrodes; said bias establishing circuit means including an intermediate frequency amplifier arranged for providing direct-current voltage amplification of a direct-current input voltage, said amplifier including a resistive load impedance and means direct-current intercoupling said load impedance and one of said cathode-ray tube input electrodes; circuit means for providing a direct-current voltage having an amplitude which is proportional to the maximum amplitude of a received radio frequency signal and independent of average scene brightness of a video signal and for coupling said direct-current voltage to said intermediate frequency amplifier in a manner for causing said latter direct-current voltage to be generated in amplified form across said load impedance, whereby the background brightness of a reproduced image is increased and decreased when a respective increase and decrease occurs in the amplitude of a received radio frequency signal.

7. In a television receiver, automatic brightness control means comprising: a cathode-ray tube for displaying a video signal modulation component of a received radio frequency signal; said cathode-ray tube having first and second video signal input electrodes; a ground bus; an intermediate frequency amplifying stage including an electron discharge amplifying device having cathode and control electrodes; a resistive load impedance coupled between said cathode electrode and said ground bus and means by-passing alternating currents around said resistive load impedance; a second resistive impedance direct-current intercoupling said resistive load impedance and said first input electrode of said cathode-ray tube; means establishing a direct-current potential at said second input electrode of said cathode-ray tube; a video signal detector circuit having a load impedance for developing a direct-current voltage component of the video signal; a synchronizing signal clipper-separator circuit having a control electrode; means coupling a composite video signal from said video detector circuit to said control electrode of said clipper-separator circuit; a source of direct-current potential; a first resistive impedance having an end coupled to said video detector load impedance; a second resistive impedance having an end coupled to said clipper-separator control electrode; a third resistive impedance having an end coupled to said source of direct-current potential; a fourth resistive impedance having an end direct-current coupled to said control electrode of said intermediate frequency amplifying device; an other end of each of said first, second, third, and fourth resistive impedances connected together.

8. The apparatus of claim 7 wherein said first, second, third, and fourth resistive impedances each comprise a single resistor.

References Cited by the Examiner

UNITED STATES PATENTS

| | | | |
|---|---|---|---|
| 2,255,484 | 9/41 | Dome | 315—30 |
| 2,550,960 | 5/51 | Brabham | 178—7.5 |
| 2,863,997 | 12/58 | Dome | 325—414 |

DAVID G. REDINBAUGH, *Primary Examiner.*

ARTHUR GAUSS, *Examiner.*